United States Patent
Sadayan Abdul Hutha et al.

(10) Patent No.: US 12,556,473 B2
(45) Date of Patent: Feb. 17, 2026

(54) GRACEFUL REMOVAL OF LACP MEMBER INTERFACES

(71) Applicant: Cisco Technology, Inc., San Jose, CA (US)

(72) Inventors: Ahamed Maideen Sadayan Abdul Hutha, Tracy, CA (US); Dhanaseker Kandhasamy, Saratoga, CA (US); Srinivas Pitta, Cupertino, CA (US); Sudeshna Ghosh, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 149 days.

(21) Appl. No.: 18/470,055

(22) Filed: Sep. 19, 2023

(65) Prior Publication Data

US 2025/0097144 A1  Mar. 20, 2025

(51) Int. Cl.
*H04L 45/24* (2022.01)
*H04L 41/08* (2022.01)
*H04L 45/02* (2022.01)
*H04L 45/42* (2022.01)

(52) U.S. Cl.
CPC .......... *H04L 45/245* (2013.01); *H04L 41/08* (2013.01); *H04L 45/02* (2013.01); *H04L 45/42* (2013.01)

(58) Field of Classification Search
CPC ....... H04L 45/245; H04L 41/08; H04L 45/02; H04L 45/42
See application file for complete search history.

(56) References Cited

U.S. PATENT DOCUMENTS

| | | | |
|---|---|---|---|
| 11,398,976 B2* | 7/2022 | Song | H04L 47/125 |
| 2012/0275297 A1* | 11/2012 | Subramanian | H04L 45/245 370/389 |
| 2015/0172112 A1 | 6/2015 | Itkin et al. | |
| 2015/0271104 A1 | 9/2015 | Chikkamath et al. | |
| 2017/0063672 A1* | 3/2017 | Chhabra | H04L 41/0663 |
| 2020/0328982 A1* | 10/2020 | Gopalarathnam | H04L 41/0816 |
| 2021/0109744 A1* | 4/2021 | Hegde | G06F 16/2379 |
| 2021/0243113 A1 | 8/2021 | Meo et al. | |
| 2022/0159102 A1 | 5/2022 | Khan et al. | |

* cited by examiner

*Primary Examiner* — Nicholas R Taylor
*Assistant Examiner* — Angela Widhalm De Rodriguez
(74) *Attorney, Agent, or Firm* — Polsinelli P.C.

(57) ABSTRACT

Methods and systems are described herein for graceful insertion and removal of at a data link layer of an open systems interconnection model (OSI Model). In one aspect, the method comprises: establishing connections to at least two ports on a first side of a link to create a link aggregation group managed using link aggregation control protocol (LACP), wherein the link aggregation group constitutes a transmit path from the first side of the link to the second side of the link. A partner device may receive, from a first port of the at least two ports, a first message, wherein the first message indicates that the first port will become unavailable to receive traffic.

20 Claims, 5 Drawing Sheets

GRACEFUL REMOVAL OF LACP MEMBER INTERFACES

TECHNICAL FIELD

This disclosure relates generally to graceful removal of Link Aggregation Control Protocol (LACP) member interfaces in a port-channel or virtual port channel (VPC) during a graceful insertion and removal (GIR) event.

BACKGROUND

In order to take down a port channel in a network for maintenance or software upgrades, the hardware must "drain" the data and/or packets that were in transit at the time of the take down. The time to drain the data is dependent on many variables, including the amount of data, the network, delay propagation, the distance to drain, etc. Additionally, the switch transmitting traffic to the port-channel must generate a buffer to delay incoming traffic. As networking speeds increase, the aforementioned procedure becomes increasingly difficult and impracticable in terms of hardware and cost. Alternatively, graceful insertion and removal of the port-channel is preferred as to not disturb the traffic that already exists within the hardware. Virtual port-channels (VPC) and port-channels are widely deployed in both enterprise, data center, and service provider networks. The proposed solution applies GIR to Layer 2 protocols, such as Link Aggregation Control Protocol (LACP), which is specific to Layer 2 implementations.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1B:
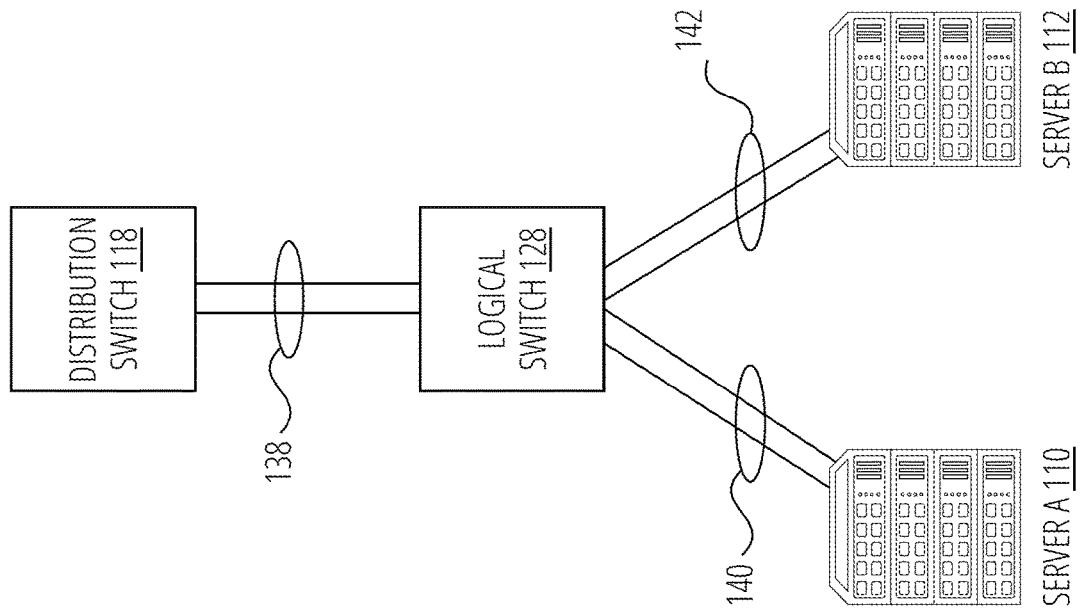
FIG. 1B illustrates an example block diagram of logical topology of the LACP-enabled device configuration according to aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

Methods and systems are described herein for graceful insertion and removal of at a data link layer of an open systems interconnection model (OSI Model). In one aspect, the method comprises establishing connections to at least two ports on a first side of a link to create a link aggregation group managed using link aggregation control protocol (LACP), wherein the link aggregation group constitutes a transmit path from the first side of the link to the second side of the link. A partner device may receive, from a first port of the at least two ports, a first message, wherein the first message indicates that the first port will become unavailable to receive traffic.

In some aspects, the first message is comprised of LACP bridge protocol data units (BPDUs). The partner device may disable transmission of traffic directed at the first port.

In some aspects, the partner device may receive, from the first port, a second message. The second message indicates that the first port is ready to transmit network traffic as part of the link aggregation group. The partner device may enable transmission of traffic directed at the first port.

In some aspects, the at least two ports are included in a port-channel or virtual port-channel. In some aspects, the connection to the source device is managed by a mux control device. In some aspects, the collection bit and the distribution bit are cleared in the first message.

In some aspects, establishing the connections to the at least two ports may additionally comprise receiving, from the at least two ports, an initial message, wherein the initial message indicates that the at least two ports are available to transmit network traffic via the transmit path. In some aspects, the at least two ports are included on a switch. In some aspects, the at least two ports are included on one or more different switches.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for graceful insertion and removal of traffic at a data link layer (i.e., Layer 2) of an OSI model. Graceful insertion and removal (GIR) is the preferred method for taking down a node for maintenance and/or software upgrades, particularly in a high-networking-speed environment. Layer 3 protocols effectively support GIR and a Layer 3 node undergoing GIR will not attract traffic. However, GIR will cause traffic loss in port-channel bundled interfaces that exist at the Layer 2 level. Due to this traffic loss, clients and/or network administrators must plan for maintenance windows for hardware or software upgrades to minimize traffic loss at the Layer 2 level. To do so, clients and/or network administrators employ alternative methods of reducing traffic loss, including data draining. Draining data, data frames, and/or data packets in transmission at the time of a take-down is inefficient and may take an increasing amount of time according to one or more variables, including the amount of data, the network, delay propagation the distance to drain, etc. Additionally, without GIR, the switch transmitting traffic to the port-channel must generate a buffer to delay incoming traffic. This procedure becomes increasingly difficult as networking speeds increase. Extending GIR to Layer 2 protocols, such as LACP, will have a profound impact on clients and/or network administrators by improving the efficiency of implementing hardware and software upgrades in a node with both Layer 3 and Layer 2 protocols, therefore improving network connectivity and efficiency and reducing data loss.

At Layer 2, graceful removal of traffic is done by sending LACP protocol data units (PDUs) from a source device to a partner device by clearing a "collection" bit so that the partner device removes the port from its transmit path. The source device may be comprised of two switches coupled, via an LACP, to the partner device. Once the source device knows that the partner device has removed its interface from the transmit path after the reception of LACP PDU with a "distribution" bit cleared, the source device can take the interfaces out of the port-channel bundle without disrupting the traffic. For example, if a source device is associated with two switches, switch A and switch B, and is connected, via an LACP, to a partner device, the source device may initiate GIR if switch B is planned for any hardware or software upgrade. GIR is initiated which sends LACP PDUs towards the partner device with the "collection" bit cleared and "distribution" bit cleared. Partner device, upon receiving the PDU, will disable transmission of traffic and switch B will not attract any traffic from the partner device/switch. At this point, switch B can initiate hardware and software upgrades.

Using this process, Layer 2 traffic loss for loss-sensitive applications designed with VPC during an upgrade or any planned event is a non-issue. The process also encourages new software upgrades by facilitating the ability to upgrade with minimal to no maintenance window. This process also can co-exist and complement the GIR for Layer 3 protocols and can guarantee lossless behavior for Layer 2 and Layer 3 traffic.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Figure 1A:
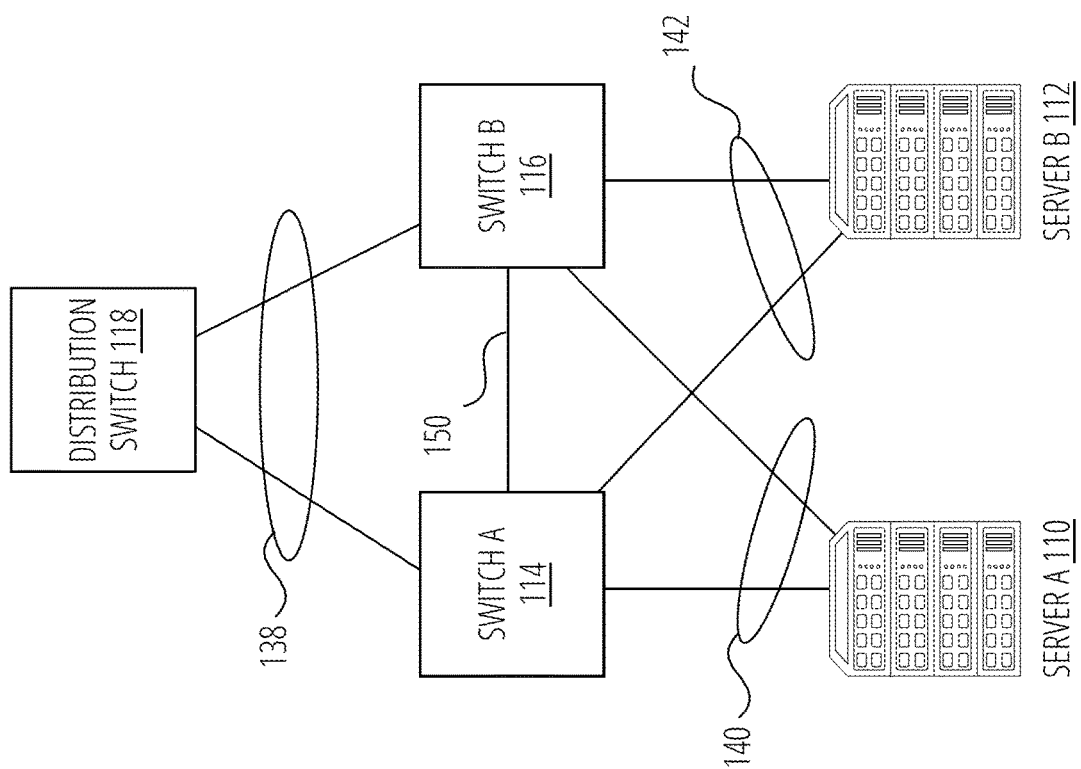
FIG. 1A illustrates an example block diagram of physical topology of an LACP-enabled device configuration according to aspects of the present technology.

FIG. 1A illustrates an example block diagram of physical topology of an LACP-enabled device configuration according to aspects of the current embodiment. FIG. 1B illustrates an example block diagram of logical topology of the LACP-enabled device configuration according to aspects of the current embodiment. FIGS. 1A and 1B are merely described as possible implementations of an embodiment and are, in no way, intended to limit the scope of the present disclosure. FIGS. 1A and 1B may be representations of the same device configuration, however FIG. 1A describes the actual, physical connections between the devices described and FIG. 1B describes the logical connections between the devices and demonstrates how data packets and/or data frames are transmitted throughout the topology. For example, switch A 114 and switch B 116 may be logically combined using LACP (shown via LACP 150) and correspond to logical switch 128.

Incorporating Graceful Insertion and Removal (GIR) at a Layer 2 level using Link Aggregation Control Protocol (LACP) can minimize data loss during GIR events at a corresponding Layer 3 level. LACP is a standardized networking protocol used to manage the bundling of multiple physical network links, forming a single logical link. It enables the implementation of link aggregation, also known as Ethernet bonding or port trunking, which allows for increased bandwidth, redundancy, and load balancing in network connections. LACP operates at the Data Link Layer (Layer 2) of the OSI model and works by dynamically negotiating and managing the creation and operation of link aggregation groups (LAGs) between network devices, such as switches or routers. For example, FIG. 1A shows LAG 138, LAG 140, and LAG 142. These LAG groups within the LACP configuration can also be seen in FIG. 1B (LAG 138, LAG 140, and LAG 142). These LAGs combine multiple physical links into a virtual link, often referred to as a "channel" or "bundle." For example, using LACP, switch A 114 and switch B 116 (i.e., physical ports) may be combined using LACP into one logical switch 128 (i.e., an aggregated port). The physical ports and/or the aggregated port may be configured and/or referred to as a port-channel or a virtual port-channel. By combining switch A 114 and switch B 116, user devices of the respective aggregated port (e.g., logical switch 128) may transmit data frames via two possible links, thereby increasing bandwidth and providing a decreased likelihood of data loss due to connectivity failures. By utilizing LACP, network administrators can achieve increased network bandwidth by aggregating multiple links, providing improved performance and load balancing capabilities.

The purpose of LACP is to establish a standardized method for exchanging control information between the actor, the partner, and the source participating in link aggregation. This control information includes the capabilities and status of the links within the port-channel (e.g., switch A 114 and switch B 116), allowing devices to negotiate and agree upon which links should be bundled together to form the LAG. An LACP configuration has two states: "collecting" and "distributing" communicated via this control information. The two states determine whether links within a port-channel can send and receive data frames within a group of aggregated links (e.g., LAG 138, LAG 140, etc.). LACP uses a series of frames known as LACP Data Units (LACPDUs) to exchange control information. LACPDUs are sent periodically between devices, providing updates on link status and ensuring synchronization between the participating devices. Through this continuous communication, LACP enables dynamic adjustment and management of link aggregation based on changes in network conditions, such as link failures or additions.

This process is managed by a control machine (e.g., a mux control machine) (not pictured in FIGS. 1A and/or 1B), which may connect or disconnect a physical port (e.g., switch A 114 or switch B 116) to or from a group of aggregated ports (e.g., logical switch 128). The control machine may also enable or disable the state of the LACP based on certain logic included in the control information.

In some examples, the device initiating the LACP is called the actor (e.g., server A 110, and server B 112) and the device it is connecting to is called the partner (e.g., distribution switch 118). The partner and the actor may be any client device and/or provider device associated with a particular network, including, but not limited to, routers, servers, controllers, computers, databases, cloud storage devices, any combination thereof, or the like. In some other examples, the aggregated ports (e.g., logical switch 128) may be referred to as the source. In order to exchange and transmit control information, the source and the partner may be in a correct configuration managed by the control machine by the transmission of LACPDUs (e.g., bridge protocol data units). A configuration may be determined by at least three bits of data transmitted by the source and the partner.

In some examples, the at least three bits of data may correspond to a synchronization bit, a collection bit, and a distribution bit. Each member of the source device (e.g., the individual switches that comprise logical switch 128, such as switch A 114 and switch B 116) may transmit a respective at least three bits of data. If the synchronization bit is set to "true" (e.g., "1" or "on") for the partner and the source (e.g., respective members of the source), the devices are ready to collect and/or distribute data. If the collection bit is set to true, any data frames received on the source will be gathered and sent to a receiving user of the aggregated port. For example, logical switch 128 may gather data frames from the distribution switch 118 and send to server A 110 and/or server B 112. If the distribution bit is set to true, any data frames transmitted by a sending user of the aggregated port may be sent over the source to the recipient user of the aggregated port.

In some examples, a member of the port-channel may have a failed connection to a partner and/or actor device. For example, switch A 114 may have a failed connection to server A 110. However, due to the LACP and LAG 140, distribution switch 118 may still be able to transmit data frames to server A 110 via switch B 116. In a similar manner, distribution switch 118 may also still be able to transmit data frames to server A 110 via logical switch 128, even if a component of logical switch 128 is inoperable. In this manner, LACP enhances network reliability through link redundancy, allowing for automatic failover if one or more links in the LAG experience issues.

Figure 2:
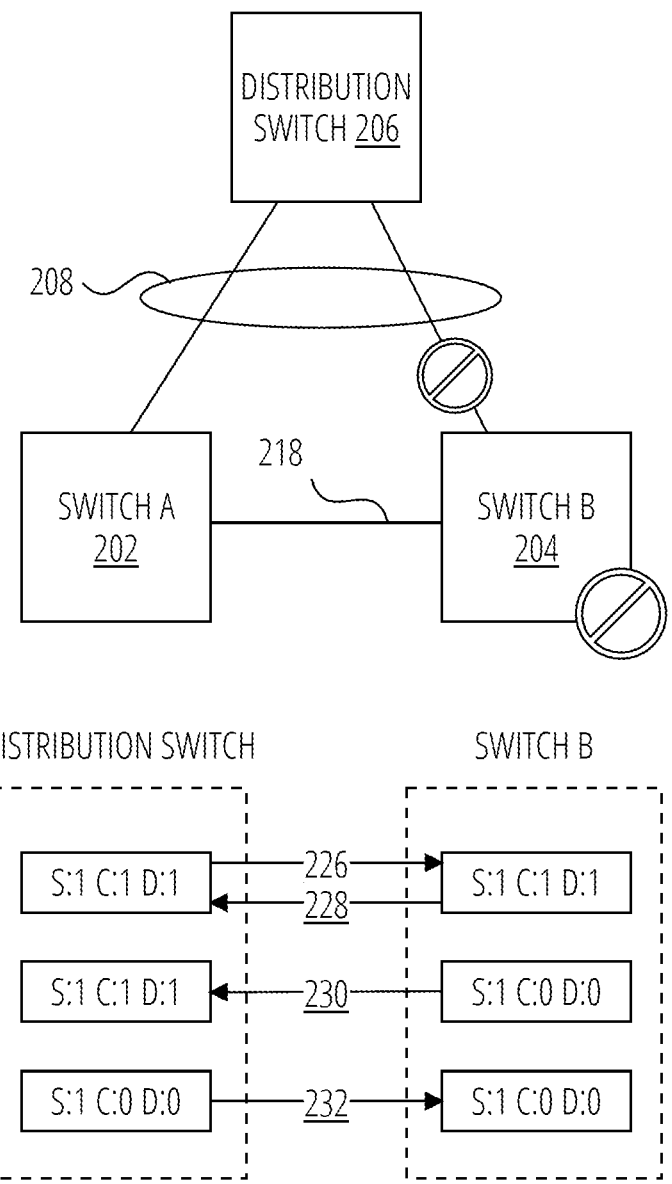
FIG. 2 illustrates an example block diagram of physical topology of an LACP-enabled device configuration undergoing graceful insertion and removal (GIR) according to aspects of the present technology.

FIG. 2 illustrates an example block diagram of physical topology of an LACP-enabled device configuration undergoing graceful insertion and removal (GIR) according to aspects of the current embodiment. FIG. 2 illustrates the source (as individual physical components switch A 202 and switch B 204) and partner device (distribution switch 206), similar to the example shown in FIGS. 1A and 1B. The source and partner device are configured using an LACP configuration using LAG 208 and LACP 218.

In some examples, a component of the source (e.g., switch B 204) may need to be disconnected from the LACP configuration. This may be for one or more reasons, including connectivity issues, hardware issues, hardware updates, software updates, maintenance, any combination thereof, or the like. To avoid data loss, the transmission and reception of traffic on switch B 204 may be temporarily (or permanently) halted using a graceful insertion and removal (GIR) event. This may be performed by the manipulation of the synchronization bit, the collecting bit, and/or the distribution bit by a control machine as described in FIGS. 1A and 1B. GIR is done by transmitting LACP PDUs from the source device (e.g., switch B 204, in this case) to the partner device by clearing the collector bit so that the partner device removes switch B 204 from a transmit path. Switch B 204 may also clear the distribution bit. In some examples, this removes switch B 204 out of the port-channel bundle without disrupting traffic.

The transmissions between distribution switch 206 and switch B 204 may be displayed in transmissions 226 through 232. Transmissions 226 and 228 may illustrate the initial state of distribution switch 206 and switch B 204 prior to the GIR event. Distribution switch 206 and switch B 204 may both be transmitting the synchronization bit, collection bit, and distribution bit as "true." The initial state prior to the GIR event may be the transmission and receipt of data frames using switch B 204 as a member of the transmit path for distribution switch 206. At transmission 230, switch B 204 begins initiating the GIR event by clearing the collection bit and the distribution bit. In some examples, the collection bit is cleared first in a first transmission and the distribution bit is cleared in a second, subsequent transmission. In some examples, as shown in transmission 230, the collection bit and the distribution bit are cleared simultaneously in the same transmission. At transmission 232, distribution switch 206 may clear the respective collection bit and distribution bit associated with distribution switch 206. Transmission 232 indicates that the GIR process has been completed and switch B 204 has been removed from the transmit path and/or the port-channel bundle. Switch B 204 may not attract any more traffic from distribution switch 206. Switch B 204 may initiate hardware and software upgrades without disrupting the transmission of data packets or traffic.

Figure 3:
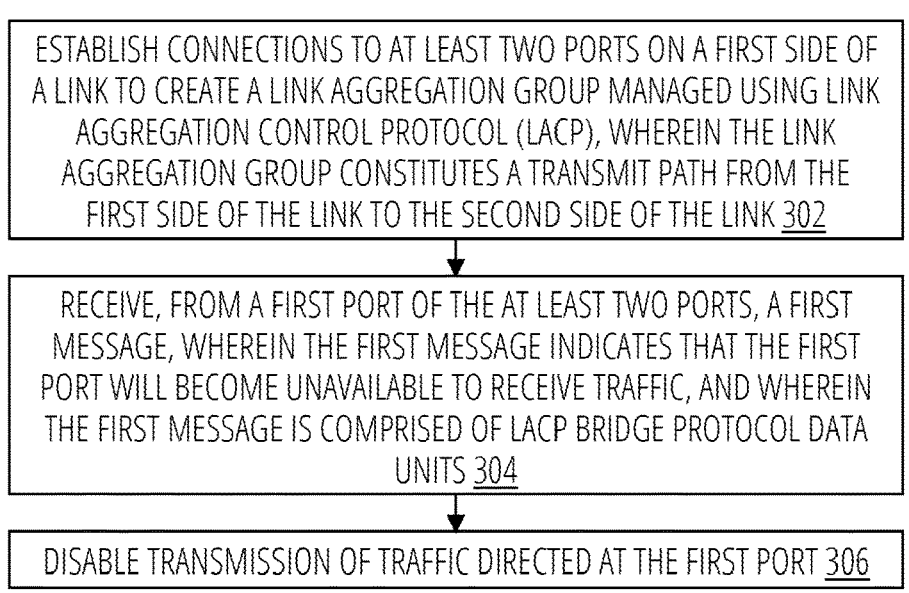
FIG. 3 illustrates a routine 300 for implementing graceful removal of LACP member interfaces in a port-channel or virtual port channel (VPC) during a GIR event according to aspects of the present technology.

FIG. 3 illustrates a routine 300 for implementing graceful removal of LACP member interfaces in a port-channel or virtual port channel (VPC) during a GIR event according to aspects of the current embodiment. Although the example routine 300 depicts a particular sequence of operations, the sequence may be altered without departing from the scope of the present disclosure. For example, some of the operations depicted may be performed in parallel or in a different sequence that does not materially affect the function of the routine 300. In other examples, different components of an example device or system that implements the routine 300 may perform functions at substantially the same time or in a specific sequence.

According to some examples, the method includes establishing connections to at least two ports on a first side of a link to create a link aggregation group managed using link aggregation control protocol (LACP), wherein the link aggregation group constitutes a transmit path from the first side of the link to the second side of the link at block 302. For example, as described in FIGS. 1A and 1B, logical switch 128 may be comprised of switch A 114 and switch B 116 connected to distribution switch 118 via link aggregation group 138 on the first side of the link. The second side of the link may comprise LAG 140 connected to server A 110 and LAG 142 connected to server B 112, as described in FIG. 1B. The transmit path may exist between distribution switch 118 and server A 110 and/or server B 112 via logical switch 128, as described in FIG. 1B. Logical switch 128 allows traffic to/from either side of the link more than one possible route to the destination. Because more than one route is available for traffic, in case of failure or removal of a single transmit path, traffic may still flow through the link at the Layer 2 level. Thus, GIR can be performed concurrently at Layer 2 and Layer 3 elements of a node, reducing and/or eliminating data loss overall during hardware and software updates.

In some examples, one or more link aggregation groups (LAGs) may be combined to generate the transmit path. The LACP configuration may be comprised of an actor, a partner, and a source. The actor may be the device initiating the LACP. The device the actor is connecting to may be referred to as the partner. A port-channel device link connecting the actor to the partner may be referred to as the source. The actor, partner, and source may be configured to communicate via a particular network and execute a graceful insertion and removal (GIR) process, therefore reducing data loss and increasing efficiency of the network. The partner and/or actor may be any client device and/or provider device associated with the particular network, including, but not limited to, routers, servers, controllers, computers, databases, cloud storage devices, any combination thereof, or the like. In some examples, the connection to the source device is managed by a mux control device and/or a control machine. The mux control device may connect or disconnect physical ports to or from a group of aggregated ports within the LACP configuration based on certain logic within at least three bits of data. The mux control device effectively enables the LACP configuration to remove particular routes of a transmit route to allow for hardware and software updates to occur on elements of that particular route without data loss to/from the partner or actor. The LACP configuration may be determined by the at least three bits of data transmitted by the source. In some examples, the LACP configuration may also be determined by at least three bits of data transmitted by the partner.

In some examples, the at least three bits of data may correspond to a synchronization bit, a collection bit, and a distribution bit. Each member of the source device may transmit respective at least three bits of data. If the synchronization bit is set to "true" (e.g., "1" or "on") for the partner and the source, the devices are ready to collect and/or distribute data. If the collection bit is set to true, any data frames received on the source may be gathered and set to a recipient user of the port-channel. If the distribution bit is set to true, any data frames transmitted by a sending user of the port-channel may be sent over the source to the recipient user of the aggregated port.

In some examples, the connections to the at least two ports is performed by receiving, from the at least two ports, an initial message, wherein the initial message indicates that the at least two ports are available to transmit network traffic via the transmit path. The initial message may include the synchronization bit set to true, the collection bit set to true, and the distribution bit set to true. In some examples, the collection bit and/or the distribution bit may be cleared according to settings enforced by the mux control device. The settings may be received from an administrator of an associated network, a network controller, default settings, a user of an associated device, any combination thereof, or the like. The initial message indicates that the port-channel is ready to receive and transmit network traffic to and/or from the partner and actor.

According to some examples, the method includes receiving, from a first port of the at least two ports, a first message, wherein the first message indicates that the first port will become unavailable to receive traffic, and wherein the first message is comprised of LACP bridge protocol data units at block 304. For example, the first message may include the synchronization bit, the collection bit, and the distribution bit associated with switch B 204 as described in FIG. 2. The first message may indicate that GIR is to be performed at the first port. The first message may be received by the partner device and/or the actor. In some examples, the first message may comprise the synchronization bit set to true, the collection bit cleared, and the distribution bit cleared. By clearing the collection bit and the distribution bit, data loss over the port is minimized by eliminating the need for data draining and/or another method of preparing the first port to be removed from the transmit path. Clearing the collection bit and distribution bit notifies the LACP configuration to cease transmission through the first port, allowing the first port to be subjected to hardware and/or software updates with minimal interruption to the traffic. In some examples, the first message may comprise two distinct transmissions, wherein a first transmission clears the collection bit and a second transmission clears the distribution bit. In some examples, the at least two ports are included on a switch. In some other examples, the at least two ports are included on one or more different switches.

According to some examples, the method includes disabling transmission of traffic directed at the first port at block 306. For example, the distribution switch 206 (described in FIG. 2) may disable transmission of traffic directed at switch B 204 (as described in FIG. 2). Upon receipt of the first message, the partner and/or actor device may transmit a response message that comprises the synchronization bit set to true, the collection bit cleared, and the distribution bit cleared. The response message may indicate that the first port has been removed from the transmit path associated with the LACP configuration. Removal from the transmit path may conclude the GIR process, which allows the first port to be updated and/or maintained within little to no data loss. Traffic through the port may be transmitted through one or more second ports within the port, thereby reducing the impact of the first port being removed from the transmit path.

In some examples, the partner and/or actor may receive, from the first port, a second message, wherein the second message indicates that the first port is ready to transmit network traffic as part of the link aggregation group. The partner and/or actor may enable transmission of traffic directed at the first port. The second message may comprise the synchronization bit set to true, the collection bit set to true, and the distribution bit set to true. The second message may indicate that hardware updates, software updates, repairs, or any other interactions with the first port are complete and the first port is ready to receive and transmit traffic. The first port may be included in the transmit path upon receipt of the second message.

Figure 4:
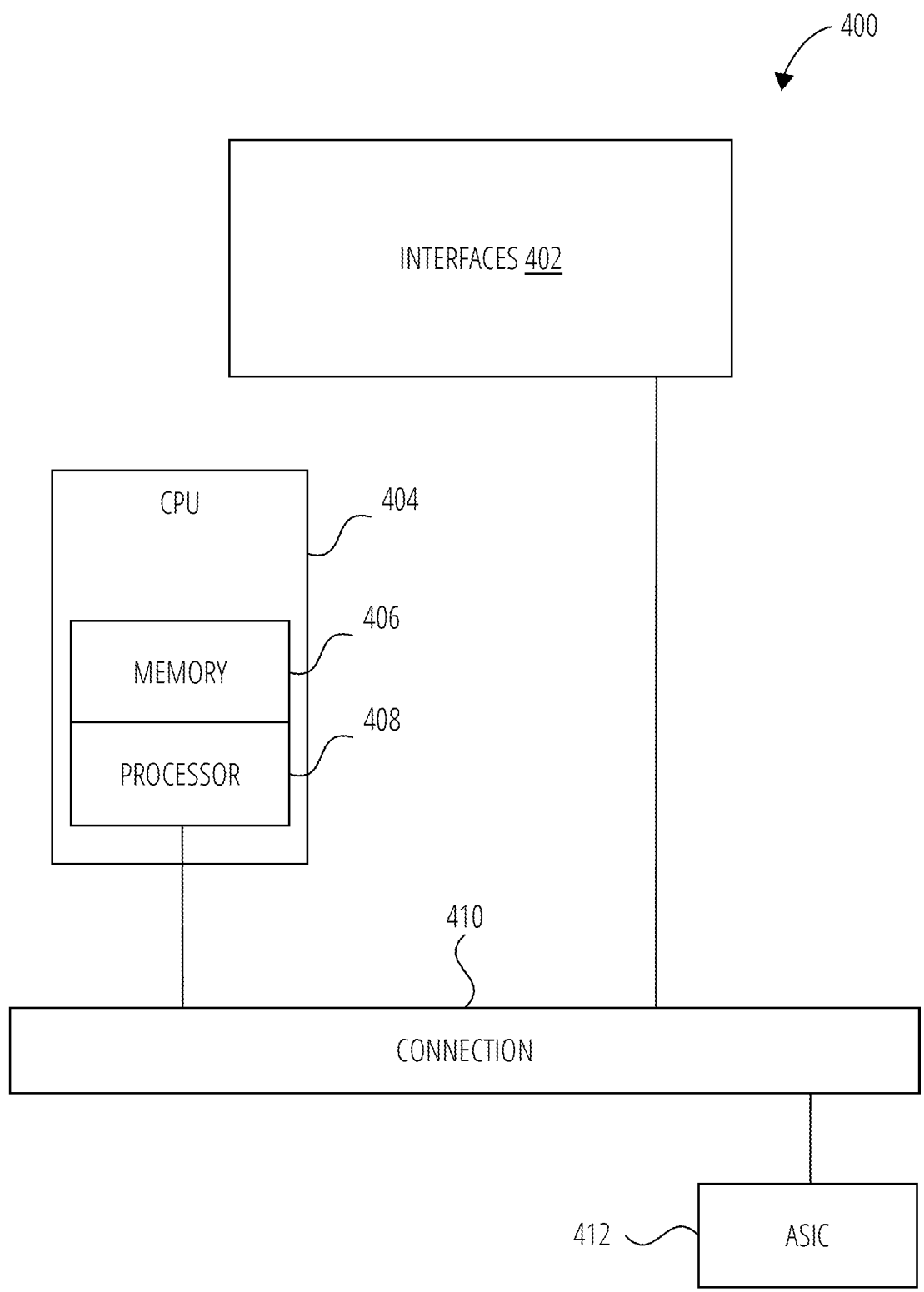
FIG. 4 illustrates an example network device in according to aspects of the present technology.

FIG. 4 illustrates an example network device 400 suitable for performing switching, routing, load balancing, and other networking operations. The example network device 400 can be implemented as switches, routers, nodes, metadata servers, load balancers, client devices, and so forth.

Network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. CPU 404 may include one or more processors 408, such as a processor from the INTEL X86 family of microprocessors. In some cases, processor 408 can be specially designed hardware for controlling the operations of network device 400. In some cases, a memory 406 (e.g., non-volatile RAM, ROM, etc.) also forms part of CPU 404. However, there are many different ways in which memory could be coupled to the system.

The interfaces 402 are typically provided as modular interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., CPU 404) to efficiently perform routing computations, network diagnostics, security functions, etc.

Although the system shown in FIG. 4 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 406 could also hold various software containers and virtualized execution environments and data.

The network device 400 can also include an application-specific integrated circuit (ASIC) 412, which can be configured to perform routing and/or switching operations. The ASIC 412 can communicate with other components in the network device 400 via the connection 410, to exchange data and signals and coordinate various types of operations by the network device 400, such as routing, switching, and/or data storage operations, for example.

Figure 5:
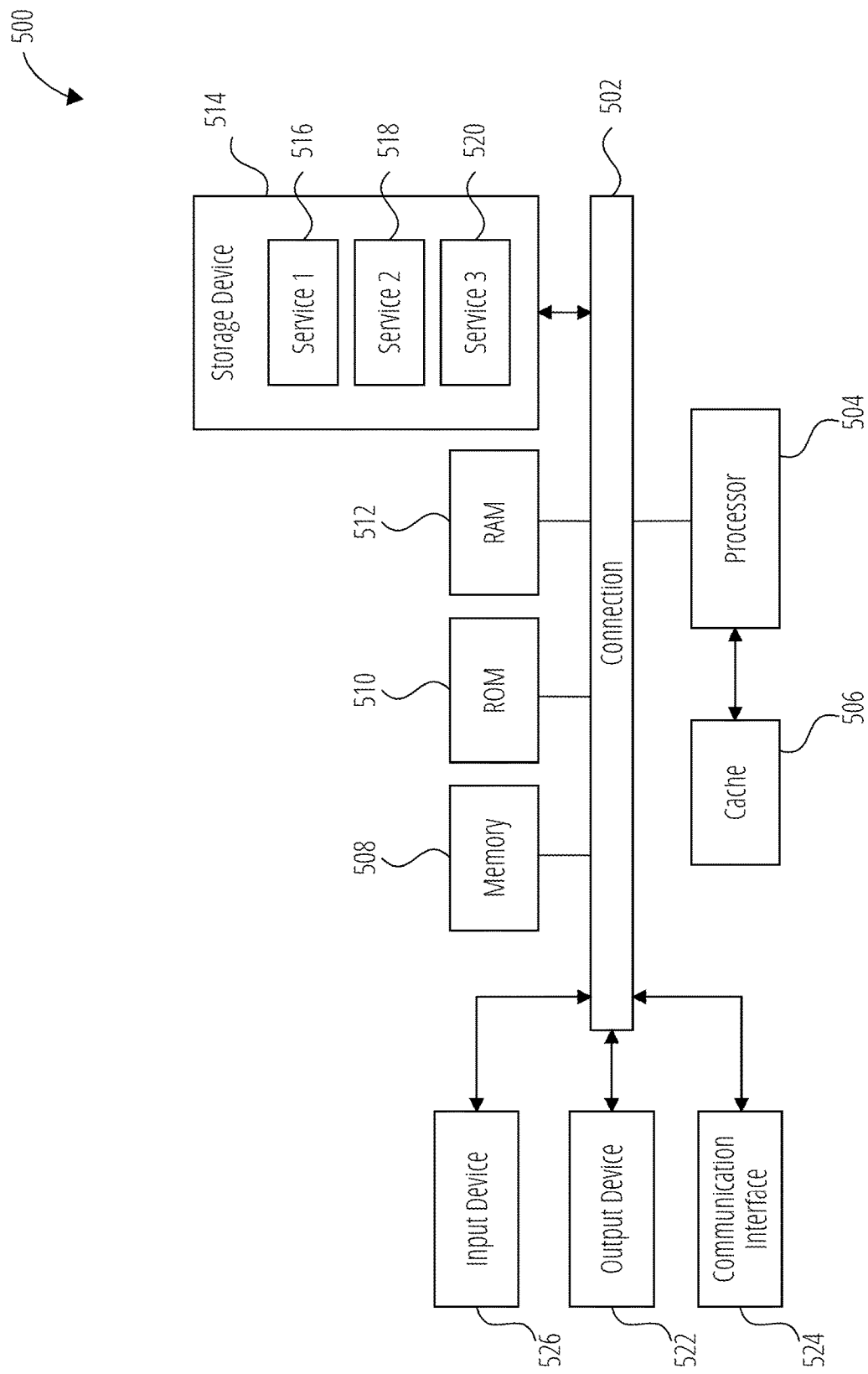
FIG. 5 shows an example computing system for a computing device undergoing graceful removal of LACP member interfaces in a port-channel or VPC during a GIR event according to aspects of the present technology.

FIG. 5 shows an example computing system for a computing device undergoing graceful removal of LACP member interfaces in a port-channel or VPC during a GIR event according to aspects of the current embodiment. Further, FIG. 5 shows an example of computing system 500, which can be for example any computing device making up graceful insertion and removal at a data link layer in LACP configurations shown in FIGS. 1A, 1B, and 2, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for implementing graceful insertion and removal at a data link layer of an open systems interconnection model (OSI Model), comprising:
   establishing connections to at least two ports on a first side of a link to create a link aggregation group managed using link aggregation control protocol (LACP) by an initial message with a synchronization bit as true, a collection bit as true, and a distribution bit as true, wherein the link aggregation group constitutes a transmit path from the first side of the link to a second side of the link;
receiving, from a first port of the at least two ports, a first message, wherein the first message indicates that the first port will become unavailable to receive traffic by the synchronization bit as true, the collection bit as clear, and the distribution bit as clear, and wherein the first message is comprised of LACP bridge protocol data units; and
transmitting, a response message which indicates that the first port of the at least two ports has been removed from the transmit path, wherein the removal includes removing the first port from an LACP configuration;
in response to the first port being removed from the transmit path, disabling transmission of traffic directed at the first port.

2. The computer-implemented method of claim 1, further comprising:
receiving, from the first port, a second message, wherein the second message indicates that the first port is ready to transmit network traffic as part of the link aggregation group; and
enabling transmission of traffic directed at the first port.

3. The computer-implemented method of claim 1, wherein the at least two ports are included in a port-channel or virtual port-channel.

4. The computer-implemented method of claim 1, wherein the connection to the at least two ports is managed by a mux control device.

5. The computer-implemented method of claim 1, wherein establishing the connections to the at least two ports further comprises:
receiving, from the at least two ports, an initial message, wherein the initial message indicates that the at least two ports are available to transmit network traffic via the transmit path.

6. The computer-implemented method of claim 1, wherein the at least two ports are included on a switch.

7. The computer-implemented method of claim 1, wherein the at least two ports are included on one or more different switches.

8. A computing apparatus comprising:
a processor; and
a memory storing instructions that, when executed by the processor, configure the apparatus to:
establish connections to at least two ports on a first side of a link to create a link aggregation group managed using link aggregation control protocol (LACP) by an initial message with a synchronization bit as true, a collection bit as true, and a distribution bit as true, wherein the link aggregation group constitutes a transmit path from the first side of the link to a second side of the link;
receive, from a first port of the at least two ports, a first message, wherein the first message indicates that the first port will become unavailable to receive traffic by the synchronization bit as true, the collection bit as clear, and the distribution bit as clear, and wherein the first message is comprised of LACP bridge protocol data units;
transmit, a response message which indicates that the first port of the at least two ports has been removed from the transmit path, wherein the removal includes removing the first port from an LACP configuration; and
in response to the first port being removed from the transmit path, disable transmission of traffic directed at the first port.

9. The computing apparatus of claim 8, wherein the instructions further configure the apparatus to:
receive, from the first port, a second message, wherein the second message indicates that the first port is ready to transmit network traffic as part of the link aggregation group; and
enable transmission of traffic directed at the first port.

10. The computing apparatus of claim 8, wherein the at least two ports are included in a port-channel or virtual port-channel.

11. The computing apparatus of claim 8, wherein the connection to the at least two ports is managed by a mux control device.

12. The computing apparatus of claim 8, wherein establishing the connections to the at least two ports further comprises:
receive, from the at least two ports, an initial message, wherein the initial message indicates that the at least two ports are available to transmit network traffic via the transmit path.

13. The computing apparatus of claim 8, wherein the at least two ports are included on a switch.

14. The computing apparatus of claim 8, wherein the at least two ports are included on one or more different switches.

15. A non-transitory computer-readable storage medium, the computer-readable storage medium including instructions that when executed by a computer, cause the computer to:
establish connections to at least two ports on a first side of a link to create a link aggregation group managed using link aggregation control protocol (LACP) by an initial message with a synchronization bit as true, a collection bit as true, and a distribution bit as true, wherein the link aggregation group constitutes a transmit path from the first side of the link to a second side of the link;
receive, from a first port of the at least two ports, a first message, wherein the first message indicates that the first port will become unavailable to receive traffic by the synchronization bit as true, the collection bit as clear, and the distribution bit as clear, and wherein the first message is comprised of LACP bridge protocol data units;
transmit, a response message which indicates that the first port of the at least two ports has been removed from the transmit path, wherein the removal includes removing the first port from an LACP configuration; and
in response to the first port being removed from the transmit path, disable transmission of traffic directed at the first port.

16. The computer-readable storage medium of claim 15, wherein the at least two ports are included in a port-channel or virtual port-channel.

17. The computer-readable storage medium of claim 15, wherein the connection to the at least two ports is managed by a mux control device.

18. The computer-readable storage medium of claim 15, wherein establishing the connections to the at least two ports further comprises:
receive, from the at least two ports, an initial message, wherein the initial message indicates that the at least two ports are available to transmit network traffic via the transmit path.

19. The computer-readable storage medium of claim 15, wherein the at least two ports are included on a switch.

20. The computer-readable storage medium of claim 15, wherein the at least two ports are included on one or more different switches.

* * * * *